US012693827B2

(12) United States Patent
Du et al.

(10) Patent No.: US 12,693,827 B2
(45) Date of Patent: Jul. 28, 2026

(54) SCREEN EXTENSION ACROSS DEVICE DISPLAYS

(71) Applicant: Lenovo (United States) Inc., Morrisville, NC (US)

(72) Inventors: Wenyu Du, Beijing (CN); Rod D. Waltermann, Rougemont, NC (US); Jung Hwan Hong, Cary, NC (US); Christopher Smith, Franklinton, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 18/902,679

(22) Filed: Sep. 30, 2024

(65) Prior Publication Data

US 2026/0093436 A1      Apr. 2, 2026

(51) Int. Cl.
*G06F 3/048*          (2013.01)
*G06F 3/14*           (2006.01)

(52) U.S. Cl.
CPC .................................. *G06F 3/1446* (2013.01)

(58) Field of Classification Search
None
See application file for complete search history.

(56) References Cited

U.S. PATENT DOCUMENTS

2013/0132885 A1*   5/2013   Maynard ............. G06F 3/04842
                                                       715/777
2022/0391158 A1*  12/2022   Lemmens ............. G06F 3/0486

* cited by examiner

*Primary Examiner* — Carl Adams
(74) *Attorney, Agent, or Firm* — FERENCE & ASSOCIATES LLC

(57)                ABSTRACT

One embodiment provides a device, including: presenting, on each of a display of an information handling device and a display of at least one secondary device, a graphical user interface, wherein the presenting comprises presenting at least one visual indicator on the display of the information handling device, wherein the information handling device and the at least one secondary device are paired; receiving, at a screen extension system, user input at the at least one visual indicator to extend a screen displayed on the display of the information handling device to the display of the at least one secondary device; and extending, in response to the user input and utilizing the screen extension system, the screen of the information handling device across the display of the at least one secondary device. Other aspects are claimed and described.

18 Claims, 6 Drawing Sheets

SCREEN EXTENSION ACROSS DEVICE DISPLAYS

BACKGROUND

Multiple display device systems allow a user to view more information than previously permitted. Such systems allow a user to move between items with ease and potentially be more productive with their time. When viewing multiple pieces of data simultaneously, a user may be more engaged with one piece over any additional information being displayed. Additionally, and/or alternatively, a user may desire viewing information be more concentrated or at a larger scale in order to full grasp what is present in the information. Users may accomplish this by extending a screen on one display to cover another display. This allows the user to view the information on an even larger footprint than viewing the information on a single display.

BRIEF SUMMARY

In summary, one aspect provides a method, including: presenting, on each of a display of an information handling device and a display of at least one secondary device, a graphical user interface, wherein the presenting includes presenting at least one visual indicator on the display of the information handling device, wherein the information handling device and the at least one secondary device are paired; receiving, at a screen extension system, user input at the at least one visual indicator to extend a screen displayed on the display of the information handling device to the display of the at least one secondary device; and extending, in response to the user input and utilizing the screen extension system, the screen of the information handling device across the display of the at least one secondary device.

Another aspect provides a system, the system including: an information handling device including a display; at least one secondary device including a display; a processor; a memory device that stores instructions that, when executed by the processor, causes the system to: present, on each of the display of the information handling device and the display of at least one secondary device, a graphical user interface, wherein the presenting includes presenting at least one visual indicator on the display of the information handling device, wherein the information handling device and the at least one secondary device are paired; receive, at a screen extension system, user input at the at least one visual indicator to extend a screen display on the display of the information handling device to the display of the at least one secondary device; and extend, in response to the user input and utilizing the screen extension system, the screen of the information handling device across the display of the at least one secondary device.

A further aspect provides a product, the product including: a computer-readable storage device that stores code that, when executed by a processor, causes the product to: present, on each of a display of an information handling device and a display of at least one secondary device, a graphical user interface, wherein the presenting includes presenting at least one visual indicator on the display of the information handling device, wherein the information handling device and the at least one secondary device are paired; receive, at a screen extension system, user input at the at least one visual indicator to extend a screen displayed on the display of the information handling device to the display of the at least one secondary device; and extend, in response to the user input and utilizing the screen extension system, the screen of the information handling device across the display of the at least one secondary display.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
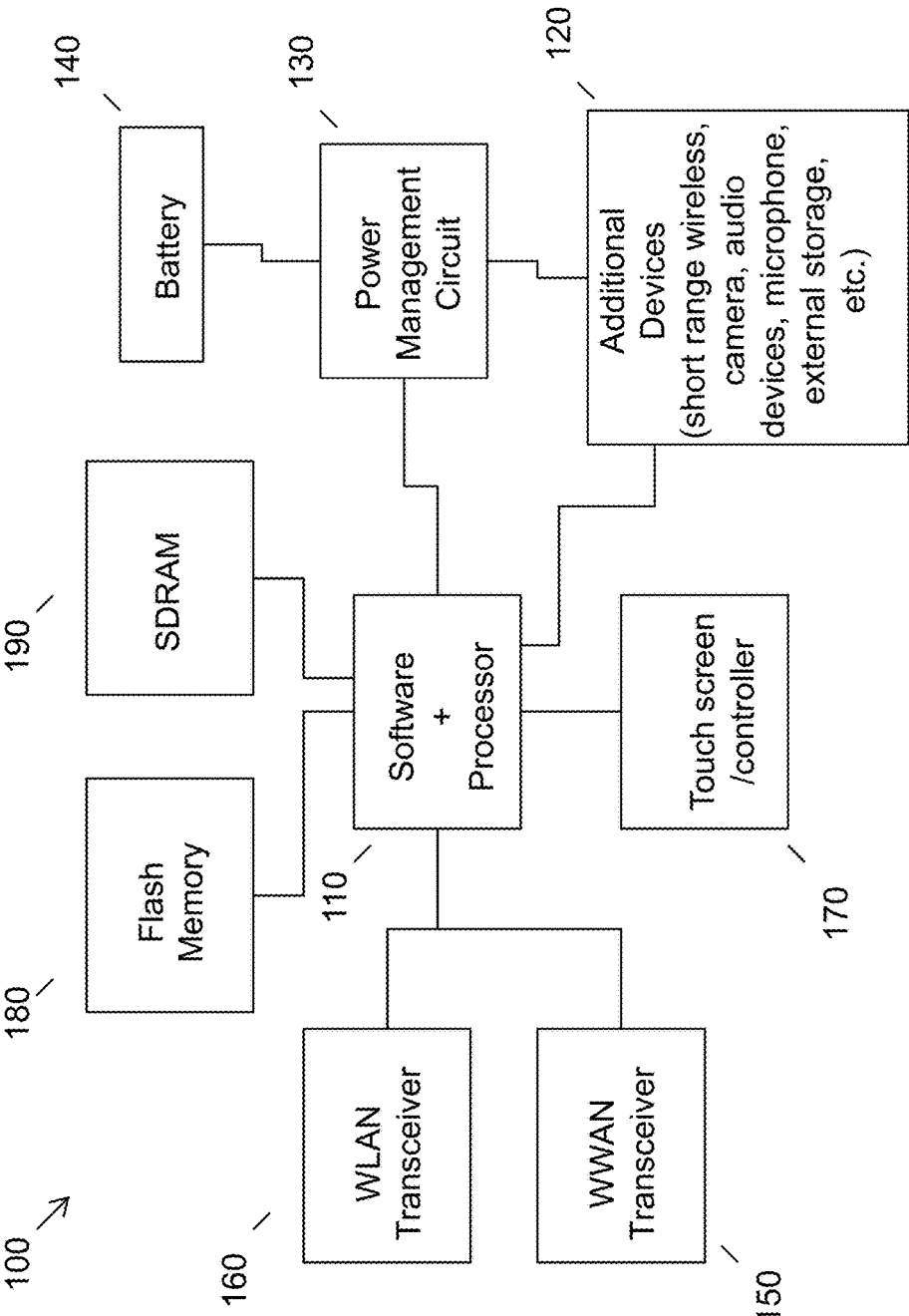
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventionally, extending a screen on a display of an information handling device across a display of another device paired to the information handling devices requires a user to navigate through display settings of the device. Display, and/or system, settings of a device will commonly provide an order of displays for each paired device, and traditionally allows for a total extension of a screen of an information handling device over a display of at least one secondary device. This extension over an additional, and/or secondary, display of another device encompasses an entire secondary device and negates viewing and use and/or operation of the display of the secondary device. In other words, extending a screen from one device to another device removes the ability to utilize the display of the secondary device for purposes unique to the secondary device.

Additionally, the conventional approach to extending a screen of an information handling device over another display can hinder productivity of a user interacting with a system because of the complicated process required to perform an extension. Many tedious steps may detour a user from what they are currently working on, resulting in an extended time period away from a task. What is needed is a system and method that may permit a seamless extending of a screen on a display of an information handling device across at least one secondary device without causing a disruption to work flow. Additionally, and/or alternatively, a dynamic extending of a screen that further permits utilization of a secondary device or the display of the secondary device is further desired.

Accordingly, the described system provides a method for extending a screen of an information handling device across a display of at least one secondary device by use of a screen extension system. The screen extension system may present a graphical user interface across the display of each device that have been paired so that they can communicate with each other. The graphical user interface may further include presenting at least one visual indicator on the display of the information handling device. Additionally, and/or alternatively, a visual indicator may also be included on the display of the at least one secondary device. The at least one visual indicator on the display of the information handling device may also indicate a direction in which the display of the at least one secondary device is being treated as an extension of the display of the information handling device. For example, if a visual indicator on the display of the information handling device is present along a right edge of the display, a user may move from a display of the information handling device through the right edge of the display to access the display of the at least one secondary device regardless of actual physical location of the secondary device.

The screen extension system of the information handling device may receive a user input at the at least one visual indicator. A user may desire to extend a screen of the information handling device across a display of the at least one secondary device for a variety of reasons, for example, to view information at a larger scale. User input received at the screen extension system may include a selection of a visual indicator present on the display of the information handling device and a movement indicating how much extending of the screen of the information handling device across the display of the at least one secondary device the user desires. The extending of the screen may be dynamically extended to encompass a portion of the display of the at least one secondary device, and/or may encompass an entirety of the display of the at least one secondary device. Then, upon determining an amount of movement included in a received input from the user, the screen extension system may extend the screen of the information handling device across the display of the at least one secondary device.

Such a system and method provide an improvement over traditional display extending methods that require accessing system settings and providing tedious input when attempting to extend a screen across another display. Additionally, the described system and method allows for a partial extension, whereas the traditional methods only allow for a full extension or no extension. Accordingly, the described system is more user friendly, more flexible, and more efficient than traditional techniques.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors include internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
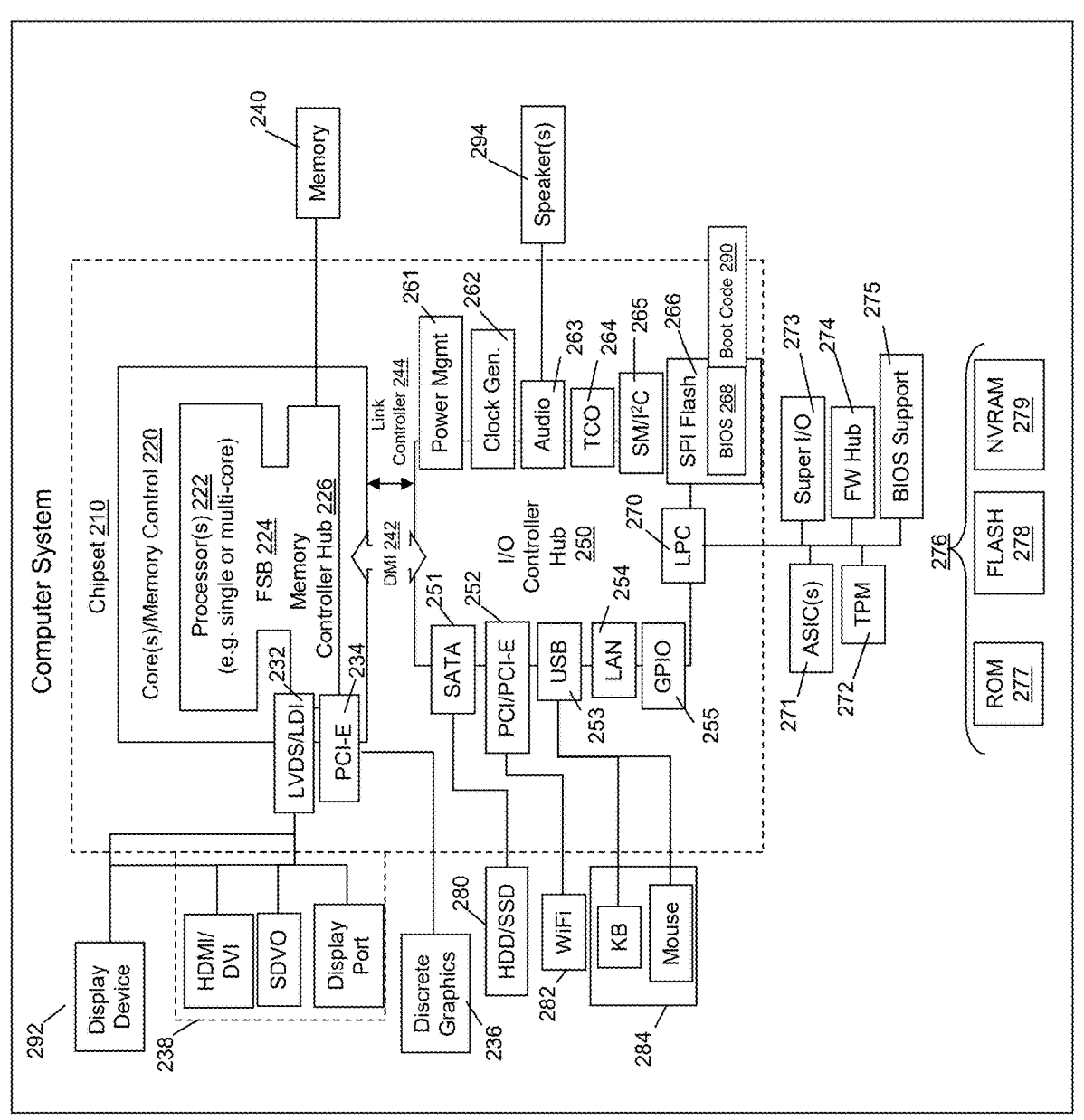
FIG. 2 illustrates another example of information handling device circuitry.

FIG. 2 depicts a block diagram of another example of information handling device circuits, circuitry, or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 include internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may include devices that may be paired with each other. For example, the circuitry outlined in FIG. 1 may be implemented in a tablet and/or personal computer environment, whereas the circuitry outlined in FIG. 2 may be implemented in a personal computer embodiment.

Figure 3:
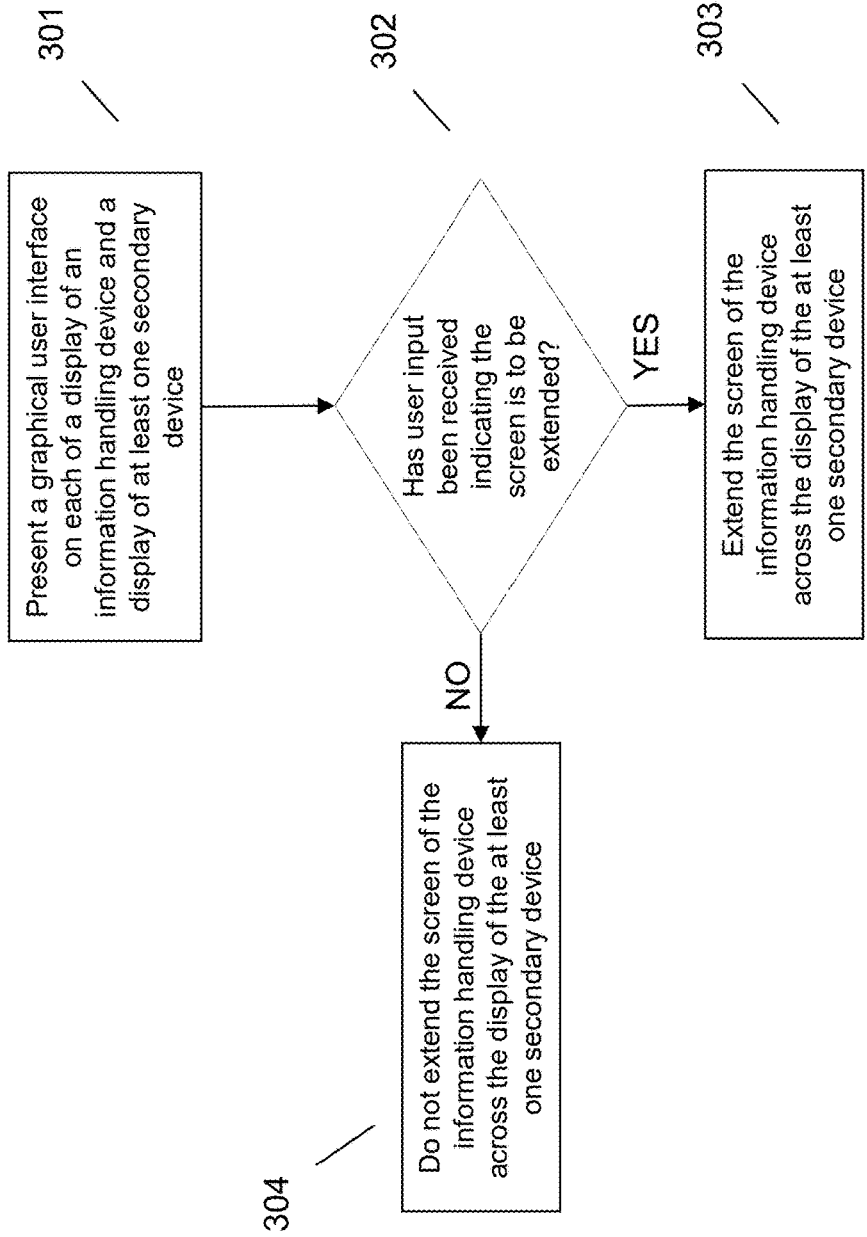
FIG. 3 illustrates an example method for extending a screen of an information handling device across a display of at least one secondary device by use of a screen extension system.

FIG. 3 illustrates an example method for pairing an information handling device and at least one additional device by use of a screen extension system. The method may be implemented on a system which includes a processor, memory device, output devices (e.g., display device, etc.), input devices (e.g., keyboard, touch screen, mouse, microphones, sensors, etc.), and/or other components, for example, those discussed in connection with FIG. 1 and/or FIG. 2. While the system may include known hardware and software components and/or hardware and software components developed in the future, the system itself is specifically programmed to perform the functions as described herein to extend a screen of an information handling device across a display of at least one secondary device by use of a screen extension system that presents a graphical user interface and then receives a user input at the graphical user interface. Additionally, the screen extension system includes modules and features that are unique to the described system.

Activation of the screen extension system may be a manual activation of the screen extension system and/or an automatic activation of the screen extension system. The automatic activation of the screen extension system may be based upon the detection of a trigger event indicating that the system should be activated.

The screen extension system may be made of multiple systems or modules that communicate together to make up the screen extension system or may be a single system. The screen extension system may be a standalone system, may be accessible through other computing devices, and/or a combination thereof. For example, the screen extension system may be a standalone system that can be accessed by a user and/or may be or provide an application that is accessible by a user on another computing device. The screen extension system may be accessible using any type of computing device, for example, personal computer, laptop computer, smartphone, tablet, smartwatch, head-mounted display, smart television or other smart appliance, augmented reality device, virtual reality device, and/or the like.

Thus, the screen extension system may be a standalone system, may be accessible through other computing devices, and/or a combination thereof. For example, the screen extension system may be a standalone system accessed by a user and/or may be provided as an application that is accessible by a user on a computing device. The screen extension system may be accessible using any type of computing device, for example, a personal computer, laptop computer, smartphone, tablet, smartwatch, smart television, smart appliance, augmented reality device, virtual reality device, and/or the like. The screen extension system may be accessible locally using a computing device where the screen extension system is installed and/or may be accessible remotely through another computing device. However, the screen extension system may be located and operated on an information handling device to perform the described steps.

The screen extension system may utilize one or more artificial intelligence models in presenting a graphical user interface to a user across paired devices, receiving user input at a visual indicator present on one of the paired devices, extending the screen of device across the screen of a secondary device, and/or the like. Artificial intelligence models may also be used for steps within a step. For example, a model could be utilized in presenting a graphical user interface and determining an information handling device and at least one secondary device are paired. As another example, a model could be utilized to receive user input at a visual indicator and determine that a movement of the visual indicator is present upon receiving the user input, detect and analyze user input, and/or the like. For ease of readability, the majority of the description will refer to a single artificial intelligence model. However, it should be noted that an ensemble of artificial intelligence models or multiple artificial intelligence models may be utilized. Additionally, the term artificial intelligence model within this application encompasses neural networks, machine-learning models, deep learning models, artificial intelligence models or systems, and/or any other type of computer learning algorithm or artificial intelligence model that may be currently utilized or created in the future.

The artificial intelligence model may be a pre-trained model that is fine-tuned for the screen extension system or may be a model that is created from scratch. Since the screen extension system is used in conjunction with extending a screen on a display based upon input received from a user, some models that may be utilized by the system are image analysis models, audio analysis models, gesture analysis models, other analysis models, entity identification models, similarity identification models, language models, large language models, filtering models, classification models, and/or the like. The model may be trained using one or more training datasets. Additionally, as the model is deployed, it may receive feedback to become more accurate over time. The feedback may be automatically ingested by the model as it is deployed. For example, as the model is used to perform the described method, if a user modifies predictions that were made by the model, provides feedback regarding a prediction, or otherwise provides some indication that the predictions or selections made by the model may be incorrect, the model ingests this feedback to refine the model.

On the other hand, as the model makes predictions in connection with performing the described steps, and no changes are made to the resulting prediction, the model may utilize this as feedback to further refine the model. This may be referred to as reinforcement training where a prediction that was made by the model is reinforced as the correct prediction. The feedback, either from incorrect predictions or correct predictions, can also be stored in a data storage location for subsequent training of the model. Training the model may be performed in one of any number of ways including, but not limited to, supervised learning, unsupervised learning, semi-supervised learning, training/validation/testing learning, and/or the like.

As previously mentioned, an ensemble of models or multiple models may also be utilized. Some example models that may be utilized are variational autoencoders, generative adversarial networks, recurrent neural network, convolutional neural network, deep neural network, autoencoders, random forest, decision tree, gradient boosting machine, extreme gradient boosting, multimodal machine learning, unsupervised learning models, deep learning models, transformer models, inference models, and/or the like, including models that may be developed in the future. The chosen model structure may be dependent on the particular task that will be performed with that model.

The screen extension system may include different components for carrying out different functions of the system, including different steps to be performed. These components may be hardware components or software components. Some hardware components may include sensors (e.g., image capture devices, proximity sensors, microphones, accelerometers, activity trackers, health metric sensors, etc.) that can be used to present a graphical user interface to a user across paired devices, receive user input at a visual indicator present on one of a paired device and extend the screen of device across the screen of a secondary device, and/or the like. Other input devices may also be utilized, for example, mechanical input modalities (e.g., keyboard, mouse, etc.), touch input devices, gesture input devices, electromyography input devices, audio input devices, image capture devices, and/or the like. Other hardware components may be utilized to provide output from the screen extension system, for example, displays.

One software component may include a user profile which may be unique to a user and may assist in determining if there is an indication for extending a screen of an information handling device across a display of a secondary device by use of a screen extension system. For example, the user profile may include information about preferred input methods, what different inputs may indicate, how far to extend a screen based upon input, and/or the like. The user may manually input this data into the profile or the information may be populated by the system as the system learns about the user over time. For example, the system may utilize an artificial intelligence model to learn about the user, make correlations between information received from sensors and other inputs and displayed information, identify what different inputs indicate, and/or the like. This information can be populated within the user profile for use by the system during subsequent screen extension determinations. The user profile may also include other information about the user that seems to influence screen extension, for example, the displays or devices paired during a screen extension session, a location of the user during a screen extension session, information being displayed during a screen extension session, and/or the like.

At 301, a graphical user interface associated with a screen extension system may be presented on a display of an information handling device and of a display of at least one secondary device. The information handling device and the at least one secondary device may be paired devices that work in combination with one another or otherwise communicate with each. Additionally, the devices may be paired so as to permit movement across their associated displays. Accordingly, the display of the information handling device and the display of the secondary device establishes a multiple display system. It should be noted that while two devices and/or displays are discussed herein, an information handling device (referred to as the base device for ease of readability) and a secondary device (referred to as the other device for ease of readability), more than two devices and/or displays can be paired and in communication with each other. Thus, the disclosure is not limited to only two devices as the system can be utilized to work with more than two devices and/or more than two displays.

The screen extension system may include a graphical user interface that may then be presented on the display of the information handling device and the at least one secondary device. The graphical user interface may include presenting at least one visual indicator on the display of the information handling device. It should be noted that part of the graphical user interface may have no visual appearance and may simply be an overlay until some input is received. For example, until input is received at the secondary device, the portion of the graphical user interface displayed on the secondary device display may have no visual characteristics. Thus, it may appear to the user that nothing additional is being displayed on the secondary device display. Alternatively, the portion of the graphical user interface displayed on the secondary device display may be an overlay that is visible to the user, for example, a blurred overlay, a colored overlay, a blinking overlay, and/or the like. Additionally, or alternatively, the portion of the graphical user interface displayed on the secondary device display may include an icon or other graphic associated with the graphical user interface.

The displayed visual indicator may provide a user with a direction in which a display of the information handling device is paired with a display of at least one secondary device. In other words, a location or appearance of the displayed visual indicator may indicate to the user a position, from a software perspective, of the secondary device display with respect to the base device display. Thus, the visual indicator may not display an actual physical relative location of the secondary device display with respect to the information handling device display, but rather the positioning of the displays as they have been configured in software. Thus, for example, a display could be physically located on a right edge of the base device display, but can be configured to be on the top of the base device display in software.

As another example, if the display of an information handling device depicts a visual indicator along the right edge of the display of the information handling device, the graphical user interface is indicating a software relationship of the base display with a secondary device display through the right edge of the display of the information handling device. Further, using this example, the display of the at least one secondary device may then accept access and/or virtual or digital movement from a user from the base device display through the left side of the secondary device display. Additionally, and/or alternatively, multiple visual indicators may be displayed. Such a situation may indicate a plurality of paired secondary devices to the information handling device and a direction for accessing each secondary device.

A display of the secondary device may include a second visual indicator. Similar to indicating a connection between an information handling device and the at least one secondary device, the second visual indicator present on the secondary device display may indicate a software relationship between the secondary device and the information handling device. For example, if a second visual indicator is located along the left edge of the secondary device display, it may indicate that the information handling device display and the secondary device display are connected along the left edge of the secondary device display and virtual or digital movement between the two displays will occur along this edge. The visual indicator(s) may be of a shape that indicates the devices are paired. For example, the shape of each indicator may be a partial shape (e.g., a semi-circle, part of an arrow, half of a smiley face, etc.) that when viewed together presents a full shape (e.g., a circle, the full arrow, the full smiley face, etc.). As another example, two corresponding or mirrored shapes, for example, two arrows pointing towards an edge of connection, two half-moons with the outer edge of the moon pointing towards an edge of connection, and/or the like. The shape of a visual indicator may assist with illustrating a relationship and the direction of the relationship between the information handling device and the at least one secondary device.

The graphical user interface presented on the display of the information handling device and the display of the at least one secondary device may include presenting an overlay across an input area on the display of the information handling device, and/or the display of the at least one secondary device. For example, the overlay may be a blurred overlay, a transparent overlay, a colored overlay, a flashing overlay, a virtual textured overlay, and/or the like. Thereafter, the graphical user interface is presented to a user over the overlay. The overlay may lock an input area of a display while the graphical user interface is presented. In other words, the overlay ensures that information present on a display may not be modified while the graphical user interface is presented. Additionally, and/or alternatively, the graphical user interface may present the visual indicator(s) on a display of a device without an overlay, but may still lock the input area of a display. Such a use of the graphical user interface may assist with later determining a desired amount of screen extension across a display of the at least one secondary device.

The screen extension system may present the graphical user interface in response to receiving an input for activating the graphical user interface. An input for activating the graphical user interface may include selecting an icon present on the display of the information handling device, detecting a gesture associated with presenting the graphical user interface at the information handling device, automatically presenting a graphical user interface when at least one secondary device is determined to be within a threshold distance or proximity of the information handling device, and/or the like. The screen extension system may utilize one or more sensors coupled to the information handling device in determining when to present the graphical user interface on a display of an information handling device and/or a display of at least one secondary device. When automatically presenting a graphical user interface, at least one sensor of the screen extension system may capture location and/or position data of at least one secondary device. The at least one sensor may include a proximity sensor, global position system sensor, a wireless detection sensor, an electromagnetic field sensor, and/or the like.

Additionally, and/or alternatively, the system may recognize that a user is logged into both devices, that a user profile is associated with both devices, that a user has provided credentials to both devices, and/or the like. The threshold distance amount tracked by components of the screen extension system may be a predetermined distance from the information handling device. The predetermined distance from the information handling device may be established by a manufacturer of a system, configured by a user, learned by the system over time, identified using an artificial intelligence system, and/or the like.

At 302, the system may determine if user input has been received indicating the screen is to be extended. In other words, the screen extension system may determine if user input has been received at the at least one visual indicator to extend a screen displayed on the display of the information handling device to the display of the at least one secondary device. Thus, the screen extension system may receive user input at a visual indicator to extend a screen displayed on the display of the information handling device to the display of the at least one secondary device. Receiving user input at the visual indicator may include tracking user input and interaction with a system while the graphical user interface is present. The receiving the input may cause movement of the visual indicator to the secondary device display. User input may include receiving a selection input at the display of the information handling device, and/or a base display, and thereafter, detecting a movement associated with the selection input.

A user input, and/or a selection input, may be performed by use of any human-interface mechanisms (e.g., mouse, keyboard, touchscreen input, stylus, and/or the like). The screen extension system may determine an input is being provided by identifying receipt of selection input within a threshold period of time of performance of the movement (e.g., double clicking before the movement, highlighting before the movement, hovering over the indicator before the movement, etc.), may be a selection input that may be performed in conjunction with the movement or while the selection input is ongoing (e.g., press-and-hold technique, a drag-and-drop technique, a cut-and-paste technique, etc.), and/or the like.

A received user input that includes a selection input separate from the movement may require a user to perform a movement associated with the extending of a screen of the information handling device subsequent to the selection input. For example, the screen extension system may detect a double-click present on the visual indicator displayed on the information handling device, and after detecting the selection input, the movement associated with the selection input may be the moving of a cursor or the visual indicator to the secondary device display. This received user input may require a confirmation input when determining an amount of movement, for example, clicking a location on the display of the at least one secondary device within the threshold period of time, holding the movement at a location for a threshold period of time, providing a secondary input to identify the movement is done, and/or the like. Additionally, and/or alternatively, a confirming input may not be required when, for example, a cursor is present at a desired location on the secondary device display within the threshold period of time. The threshold period of time may be predetermined and may last a few seconds after detecting the selection input at the at least one visual indicator.

Additionally, and/or alternatively, when a received user input includes a selection input that may also include the movement while the selection input is ongoing, the screen extension system may track when the selection input is received at the visual indicator and where the selection input is released, for example, depressing a mouse, stopping a gesture, stopping an audio input, and/or the like, with respect to the display of the at least one secondary device. Rather than requiring the performing of a selection input, a movement, and potentially a confirmation input within a predetermined threshold period of time, utilizing a user input method that includes a selection input, movement and releasing of the selection input concurrently provides an input method that may be performed in one motion and/or step. The screen extension system may accept either version of a user input.

Additionally, the device extension system may receive user input on a base display. The base display may not be the display of the information handling device. As described herein, the base display is routinely referred to as the display of the information handling device but is not limited to being this display. Rather, the base display may be the display of the at least one secondary device, and the received input and associated movement may be initiated at the secondary device display in an attempt to extend a screen from the secondary device display across the display of the information handling device.

Additionally, and/or alternatively, receiving user input may include receiving additional user input at the visual indicator to reverse an extending. Receiving user input may include receiving input for removing an extended screen from one display back to an original base display. The user input received for removing an extended screen may be similar to the user input received for performing the extension and/or may be the reverse of the user input received for performing the extension. For example, after the screen has been extended, the user could provide a selection input to the visual indicator which then reverses the extension. As another example, after the screen has been extended, the user could drag the extended screen back to the base display. Other reversing user inputs are contemplated and possible.

Subsequent to receiving user input at a visual indicator to extend a screen, the screen extension system may determine if the received user input includes movement of the visual indicator or other movement to identify how to extend the screen or how much to extend the screen. As mentioned previously, detected movement of a received user input may be identified using a variety of techniques. If the screen extension system does not detect a user input at 302, the system may not extend the screen of the base display. Additionally, and/or alternatively, the screen extension system may receive a user input at 302, but fail to detect movement causing the at least one visual indicator to move. In such a scenario, the screen extension system will not extend the screen of the information handling device across the display of the at least one secondary device at 304.

However, when it is determined that received user input does include movement of the visual indicator at 302, the screen extension system may extend the screen of the information handling device across the display of the at least one secondary device at 303. As mentioned previously, extending the screen is performed from a base device to a secondary device. Thus, the secondary device display may be the base device permitting a screen of the secondary device display to extend across the display of an information handling device. In other words, the base device and base device display is the device and display from which the screen is being extended, regardless of whether that is the information handling device or the secondary device.

Extending the screen of the information handling device across the display of the at least one secondary device may include dynamically extending the screen across the display of the at least one secondary device based upon and in view of the movement associated with the received user input and detected by the screen extension system. Dynamically extending a screen across a display of at least one secondary device permits extending a screen across a user-desired portion of the secondary device display. In other words, when extending the screen across the display of a secondary device, the extended part of the screen is not required to encompass the entirety of the display of the secondary device. Rather, the screen extension system may permit a portion of the secondary device display to become overlayed by the screen of the information handling device based upon the received user input.

If the screen is not extended across the entirety of the secondary device display, the portion of the display that is covered by the screen may be a default portion, may be configured by a user, may be learned by the system over time, may be identified using an artificial intelligence model, and/or the like. Additionally, or alternatively, the portion may be based upon the movement input. For example, the portion may correspond to a location where the movement input stopped. As an example, if the user drags the visual indicator halfway across the secondary device display, the screen may be extended to that halfway position. In addition to allowing the user to configure how far to extend the screen, the system can display the movement of the screen across the secondary device display along with the movement of the visual indicator. This may allow the user to have more granular control of the screen extension location because the user can see the screen being extended as the movement is being made.

Accordingly, dynamically extending the screen across a display may be based upon to a predetermined portion of the display of the at least one secondary device, and/or may be achieved at any user desired parameter. The amount of the predetermined portion of the screen may be based upon one or more parameters. Accordingly, and for example, the one or more parameters may identify a fraction of the display of the secondary device that may be overlaid (e.g., one quarter of the display of the secondary device, half of the display of the secondary device, three-quarters of the display of the secondary device, and/or the like). Additionally, and/or alternatively, the extending the screen of the information handling device across the display of the at least one secondary device may be based upon user preference and/or a distance of movement of the received input across the display of the at least one secondary device (e.g., extending the screen to overlay 35 percent of the secondary device display based upon the movement extending to the 35 percent mark, etc.).

Additionally, and/or alternatively, the extending the screen of the information handling device across the display of the at least one secondary device may be across the entirety of the secondary device display, regardless of the position of the movement. Whether the screen is extended across a portion or the entirety of the display may be based upon user preferences, device settings, learned settings, and/or the like. Extending across the entire display may also be based upon the movement extending across the entire display. In other words, extending across the entire display may be responsive to the at least one visual indicator being moved to a second edge of the secondary device display that is opposite the first edge of the secondary device display of that is closest to the display of the information handling device. In other words, moving a visual indicator to the second edge of the display of the at least one secondary device opposite the edge that is connected to the information handling device display may result in the screen being overlaid the entirety of the secondary device display.

When extending the screen of the information handling device across the display of the at least one secondary device, the operating system of the information handling device controls the input area encompassing the extended portion of the display. In the event that the screen is not extended across the entire secondary device display, an operating system associated with the secondary device controls any remaining portion of the secondary device display. For example, a screen of an information handling device that is extended to encompass half of the display of the at least one secondary device may operate based upon inputs provided at the information handling device, whereas, the half of the secondary device display that is not overlaid by the extended screen may be controlled by the secondary device. Additionally, and/or alternatively, when the screen extension is across the entirety of the secondary device display, inputs received at the extended display may be based upon inputs associated with the operating system of the information handling device only. In other words, the operating system of the secondary device does not have any control over what is displayed on the extended screen when it overlays the whole secondary device display.

The screen extension system may elect to cancel the extending of the screen across the secondary device display if predetermined parameters are not met by the received input provided by a user. Failing to meet parameters may include, for example, not performing a movement within a predetermined amount of time subsequent to selection, failing to move a visual indicator to an acceptable position for encompassing a predetermined portion of the display of the at least one secondary device, failing to move a visual indicator across the entirety of the display of the at least one secondary device, moving a visual indicator outside of the edges surrounding the display of the at least one secondary device, and/or the like. For example, in response to failing to move the at least one visual indicator to a second edge of the secondary device display that only permits overlaying a display in its entirety, the screen extension system may cancel the extending of the screen across the secondary device display.

As mentioned above, subsequent to extending the screen of the information handling device across the display of the at least one secondary device, the screen extension system may receive an additional user input at the at least one visual indicator to reverse the extending. Reversing the extending responsive to receiving user input may include selecting the visual indicator and moving the visual indicator back to an edge of the display of the information handling device from the secondary device display, receiving a user input at the visual indicator that may automatically reverse the extending back to original display settings, receiving user input to reduce an amount of screen overlay on a secondary device display, and/or the like. Receiving a user input at the visual indicator that may automatically reverse the extending back to original display settings may include, for example, triple-clicking a visual indicator, right-clicking a visual indicator, selecting the "DELETE" key and/or a combination of keys while an extension across displays is present, providing a particular audible input, providing a particular gesture input, and/or the like.

The following paragraphs referencing the remaining figures illustrate the steps taken by a user utilizing a graphical user interface associated with a screen extension system. These illustrations and their descriptions are intended as being non-limiting examples, and are provided in order to assist with understating the system and methods described above. Further, the extending of a screen of a base display of an information handling device across a display of at least one secondary device may be performed utilizing methods not described in these figures.

Figure 4:
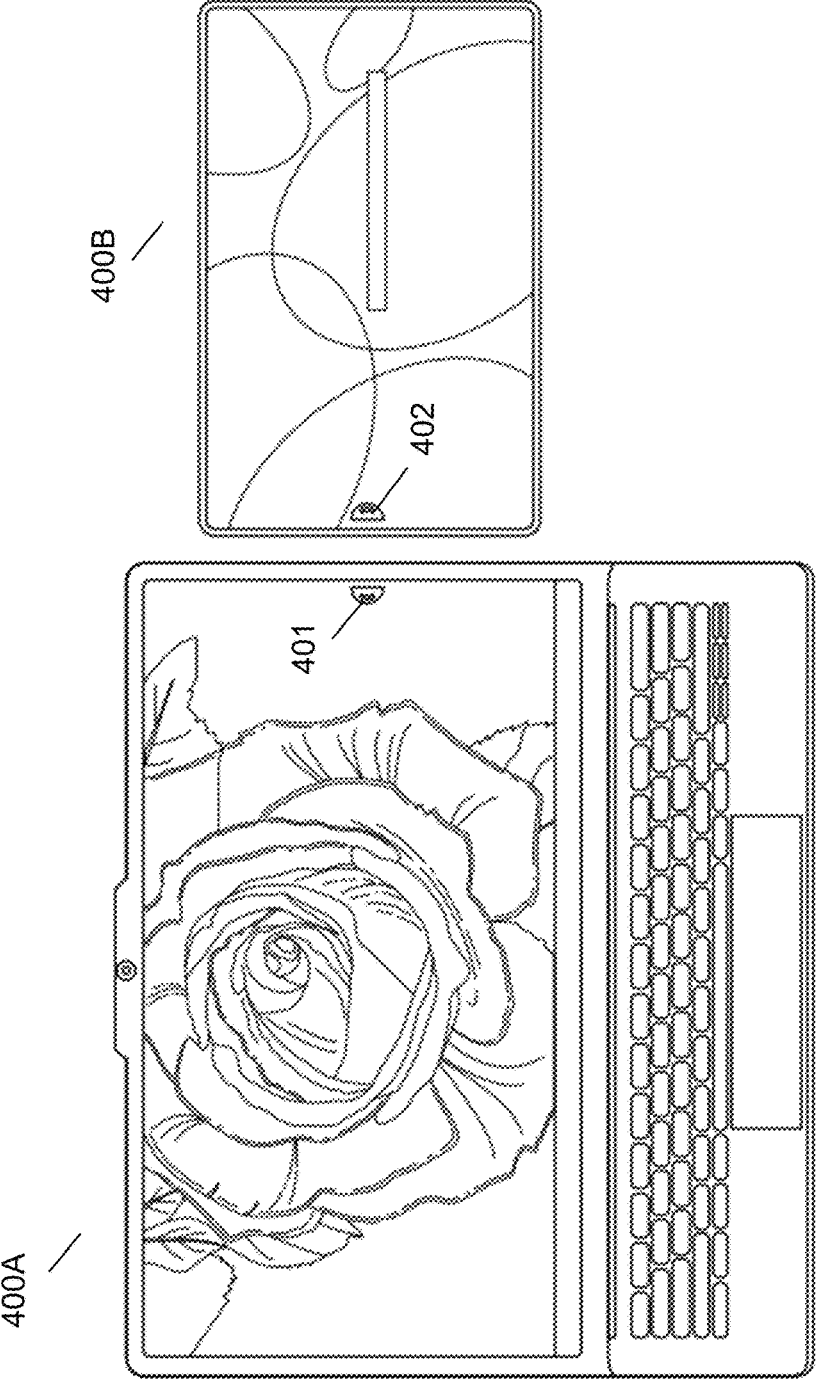
FIG. 4. provides an example illustration of a multiple display setup including two displays presenting a graphical user interface of a screen extension system.

FIG. 4 provides an example illustration of a multiple display setup including two displays presenting a graphical user interface of a screen extension system. An information handling device including a display 400A is present, as well as a secondary device including a display 400B. Information handling device 400A and secondary device 400B are paired devices that are within a predetermined threshold distance. A first visual indicator 401 is provided on the display of the information handling device 400A, and a second visual indicator 402 is provided on the display of the secondary device 400B. The presence of the first visual indicator 401 and the second visual indicator 402 establishes that these paired devices are displaying a graphical user interface. As can be seen in FIG. 4, the shape of the first visual indicator 401 is a semi-circle and is located along a right edge of the display of the information handling device 400A. Similarly, the shape of the second visual indicator 402 is a semi-circle and is located along a left edge of the display of the secondary device 400B. The visual indicators, though including the same shape, are facing opposite directions. As disclosed previously, the location of these visual indicator and/or their shaped orientation may indicate how the paired displays of 400A and 400B are configured within software. For example, a cursor may be moved through the right edge of display of 400A to access the display of 400B from the left edge.

Figure 5:
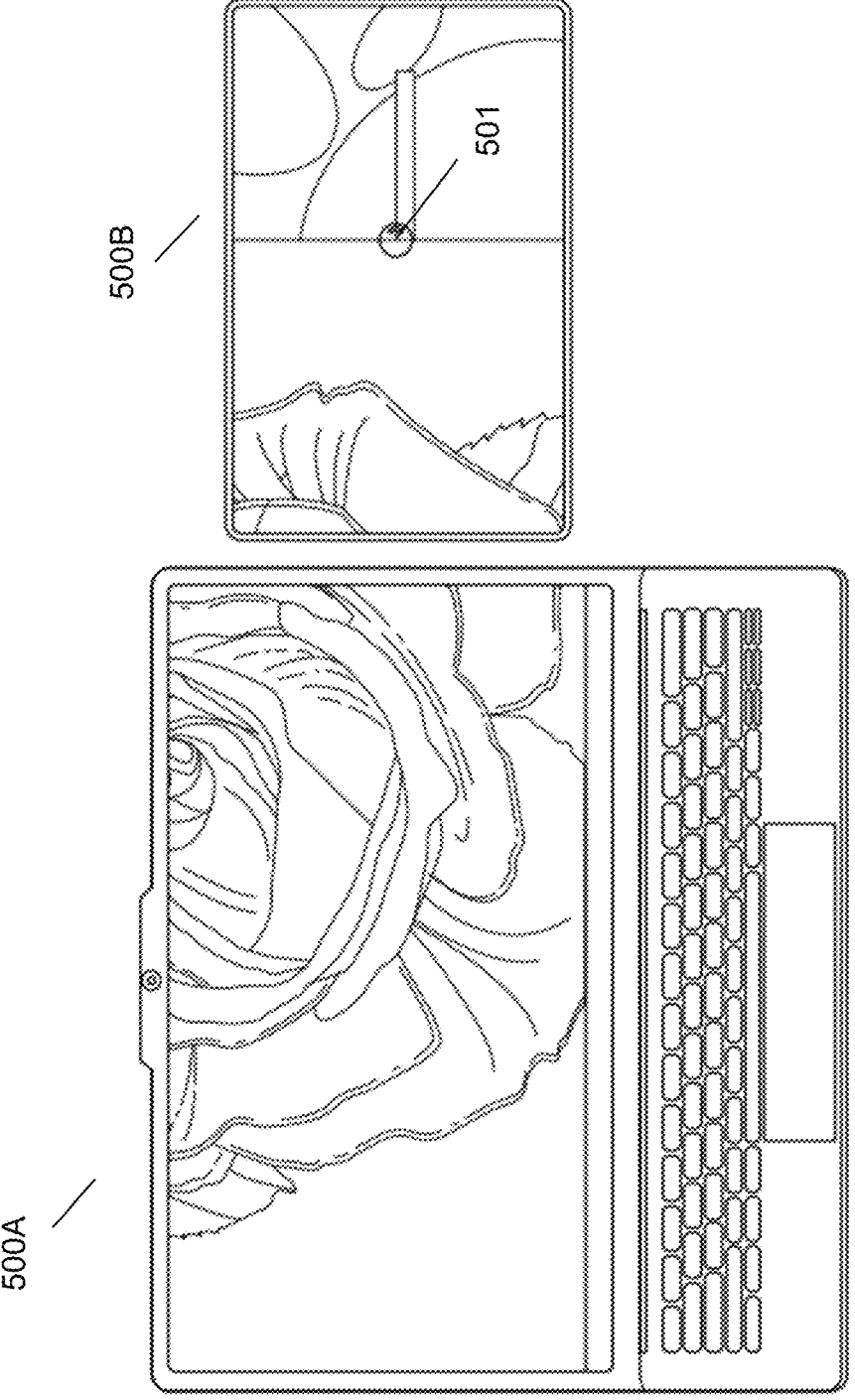
FIG. 5 provides an example illustration of a multiple display setup including two displays presenting a partial extension of a screen of an information handling device across a display of a secondary device by use of a graphical user interface of a screen extension system.

Referring to the next figure, FIG. 5 provides an example illustration of a multiple display setup including two displays presenting a partial extension of a screen of an information handling device across a display of a secondary device by use of a graphical user interface of a screen extension system. The partial extension of the screen of the information handling device 500A is being extended across the display of 500B. The amount of the partial portion is identified by the position of the visual indicator 501, and is supported by the extended image previously confined to the display of the information handling device 500A/400A. This partial extension of the display of the information handling device 500A may indicate a dynamic extension of the display of the information handling device 500A (e.g., a user desires to overlay this portion of the display of the secondary device 500B with the screen of the information handling device 500A), and/or the partial extension may identify the extending of the display of the information handling device 500A as it is being moved towards encompassing the entirety of the display of the secondary device 500B. In other words, that which is shown in FIG. 5 on the secondary device display 500B could be a result of the user wanting the screen of display 500A to be partially extended to halfway or could be a snapshot of the movement of the visual indicator 501 towards the right edge of the secondary device display 500B which would result in the entirety of the secondary device display 500B being covered by the screen.

As can be seen in comparison to the visual indicators 401 and 402 present in FIG. 4, the visual indicator 501 becomes a single visual indicator 501 upon crossing over to a display of a device (in this illustration, the first visual indicator 401 moving onto the display of the at least one secondary device 500B). Additionally, as can be observed at the visual indicator 501, the shape of the two previously separate visual indicators 401 and 402 of FIG. 4 have combined to produce a single visual indicator 501. More specifically, and used as an example, the semi-circle shape of 401 and the semi-circle shape of 402 have combined to produce a visual indicator 501 that is a complete circle. Condensing visual indicators 401 and 402 into a single visual indicator 501 assists with identifying and establishing an edge of a screen that is being extended across a display of a secondary display. Additionally, condensing the visual indicators into a single visual indicator provides the user with feedback that the desire to extend the screen has been identified.

Figure 6:
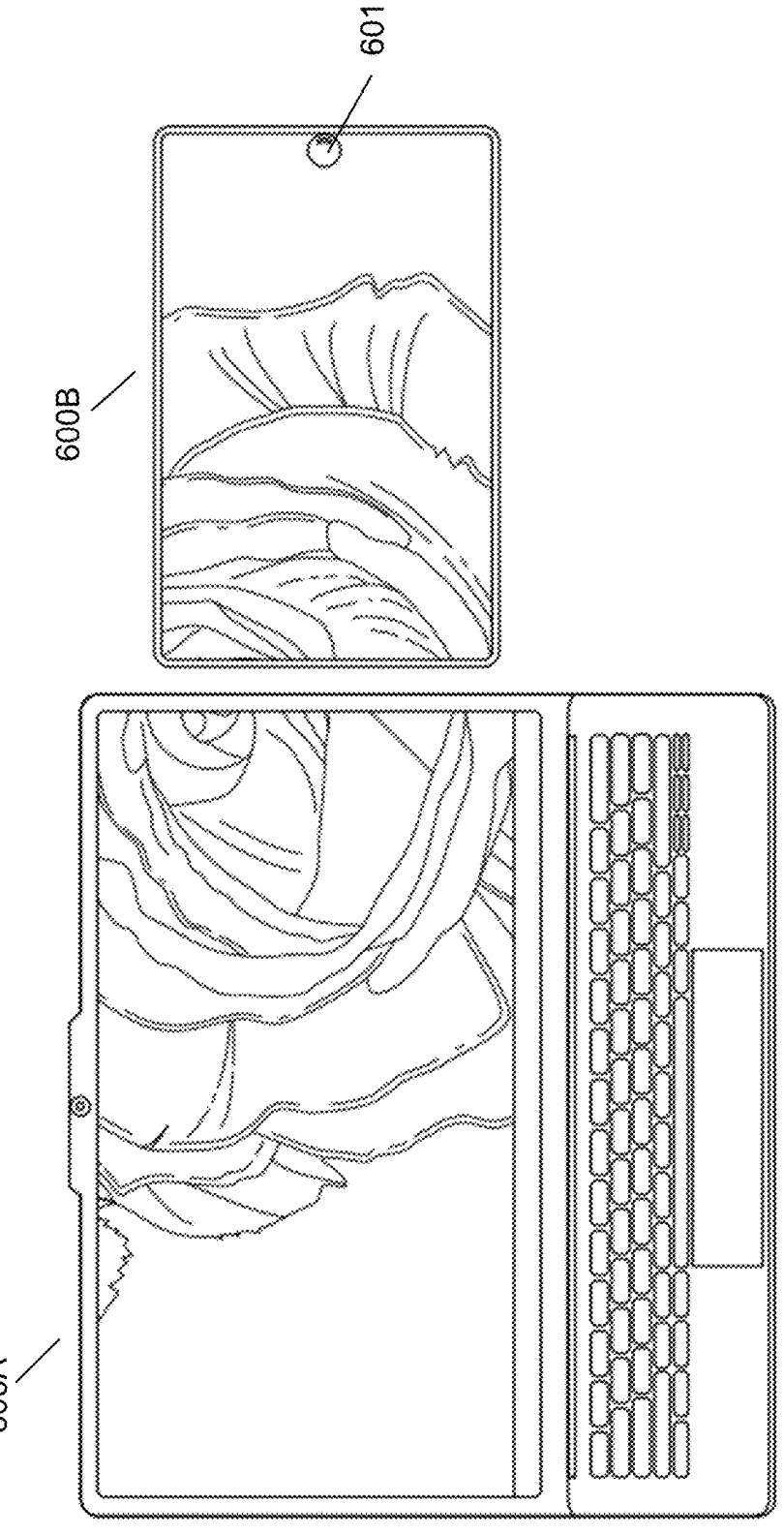
FIG. 6 provides an example illustration of a multiple display setup including two displays presenting a complete extension of a screen of an information handling device across a display of a secondary device by use of a graphical user interface of a screen extension system.

Then, FIG. 6 provides an example illustration of a multiple display setup including two displays presenting a complete extension of a screen of an information handling device across a display of a secondary device by use of a graphical user interface of a screen extension system. The single visual indicator 601/501 including a complete circle shape is viewed as being present at an opposite edge of the display of the secondary device 600B (in comparison to the original position of 402 in 400B of FIG. 4). The position of 601 further identifies that the screen of information handling device 600A encompasses the entirety of the display of secondary device 600B. This is supported by the illustration present on both displays. Additionally, as mentioned previously, the operating system of information handling device 600A now controls what is presented on the display of secondary device 600B because the screen of information handling device 600A overlays the whole display of the secondary device 600B.

The various embodiments present herein provide an improvement over traditional methods for extending a screen of an information handling device across the display of another device. Rather than requiring a user to access system settings and/or making manual changes utilizing traditional methods, the described system and method provides a screen extension system that may permit easy screen adjustment across displays by use of a graphical user interface. A screen extension system may present a graphical user interface of each display of a device paired together, and thereafter, receive a user input at the screen extension system utilizing the graphical user interface to make easy adjustment to screen sizes and display extension. This is an improvement over traditional device alignment methods that conventionally require tedious input and/or result in inconsistencies across displays.

As will be appreciated by one skilled in the art, various aspects may be embodied as a system, method, or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices, and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
presenting, on each of a display of an information handling device and a display of at least one secondary device, a graphical user interface, wherein the presenting comprises presenting at least one visual indicator on the display of the information handling device, wherein the information handling device and the at least one secondary device are paired;
receiving, at a screen extension system, user input at the at least one visual indicator to extend a screen displayed on the display of the information handling device to the display of the at least one secondary device; and
extending, in response to the user input and utilizing the screen extension system, the screen and input area of the information handling device across the display of the at least one secondary device;
wherein, when the user input at the at least one visual indicator to extend the screen is removed before the at least one visual indicator reaches at least one of: a position on the display of the at least one secondary device and an edge of the display of the at least one secondary device, the screen extension system comprises cancelling the extending the screen and the input area of the information handling device across the display of the at least one secondary device.

2. The method of claim 1, wherein the receiving the input comprises the user input causing movement of the at least one visual indicator to the at least one secondary device.

3. The method of claim 2, wherein the extending comprises dynamically extending by displaying the movement of the screen across the display of the at least one secondary device along with the movement of the at least one visual indicator.

4. The method of claim 2, wherein the extending is responsive to the at least one visual indicator being moved to a second edge of the display of the at least one secondary device that is opposite a first edge of the display of the at least one secondary device that is closest to the display of the information handling device.

5. The method of claim 1, wherein the presenting the graphical user interface comprises automatically presenting the graphical user interface when the at least one secondary device is determined to be within a threshold distance of the information handling device.

6. The method of claim 1, wherein the presenting the graphical user interface comprises displaying a second visual indicator on the display of the at least one secondary device.

7. The method of claim 1, comprising receiving additional user input at the at least one visual indicator to reverse the extending and reversing the extending responsive to receiving the additional user input.

8. The method of claim 1, wherein the presenting the graphical user interface comprises presenting a blurred overlay across an input area on the display of the information handling device and presenting the graphical user interface over the blurred overlay.

9. The method of claim 8, wherein the presenting the graphical user interface over the blurred overlay comprises locking the input area while the graphical user interface is presented.

10. A system, the system comprising:
an information handling device comprising a display;
at least one secondary device comprising a display;
a processor;
a memory device that stores instructions that, when executed by the processor, causes the system to:
present, on each of the display of the information handling device and the display of at least one secondary device, a graphical user interface, wherein the presenting comprises presenting at least one visual indicator on the display of the information handling device, wherein the information handling device and the at least one secondary device are paired;
receive, at a screen extension system, user input at the at least one visual indicator to extend a screen display on the display of the information handling device to the display of the at least one secondary device; and
extend, in response to the user input and utilizing the screen extension system, the screen and input area of the information handling device across the display of the at least one secondary device;
wherein, when the user input at the at least one visual indicator to extend the screen is removed before the at least one visual indicator reaches at least one of: a position on the display of the at least one secondary device and an edge of the display of the at least one secondary device, the screen extension system comprises cancelling the extending the screen and the input area of the information handling device across the display of the at least one secondary device.

11. The system of claim 10, wherein the receiving the input comprises the user input causing movement of the at least one visual indicator to the at least one secondary device.

12. The system of claim 11, wherein the extending comprises dynamically extending by displaying the movement of the screen across the display of the at least one secondary device along with the movement of the at least one visual indicator.

13. The system of claim 11, wherein the extending is responsive to the at least one visual indicator being moved to a second edge of the display of the at least one secondary device that is opposite a first edge of the display of the at least one secondary device that is closest to the display of the information handling device.

14. The system of claim 10, wherein the presenting the graphical user interface comprises automatically presenting the graphical user interface when the at least one secondary device is determined to be within a threshold distance of the information handling device.

15. The system of claim 10, wherein the presenting the graphical user interface comprises displaying a second visual indicator on the display of the at least one secondary device.

16. The method of claim 10, comprising receiving additional user input at the at least one visual indicator to reverse the extending and reversing the extending responsive to receiving the additional user input.

17. The system of claim 10, wherein the presenting the graphical user interface comprises presenting a blurred overlay across an input area on the display of the information handling device and presenting the graphical user interface over the blurred overlay.

18. A product, the product comprising:

a computer-readable storage device that stores code that, when executed by a processor, causes the product to:

present, on each of a display of an information handling device and a display of at least one secondary device, a graphical user interface, wherein the presenting comprises presenting at least one visual indicator on the display of the information handling device, wherein the information handling device and the at least one secondary device are paired;

receive, at a screen extension system, user input at the at least one visual indicator to extend a screen displayed on the display of the information handling device to the display of the at least one secondary device; and extend, in response to the user input and utilizing the screen extension system, the screen and input area of the information handling device across the display of the at least one secondary display;

wherein, when the user input at the at least one visual indicator to extend the screen is removed before the at least one visual indicator reaches at least one of: a position on the display of the at least one secondary device and an edge of the display of the at least one secondary device, the screen extension system comprises cancelling the extending the screen and the input area of the information handling device across the display of the at least one secondary device.

* * * * *